United States Patent [19]

Kushniryk

[11] Patent Number: 4,628,561
[45] Date of Patent: Dec. 16, 1986

[54] TELESCOPIC RAMP
[75] Inventor: Delvin J. Kushniryk, Pense, Canada
[73] Assignee: Universal Ramps Limited, Pense, Canada
[21] Appl. No.: 776,036
[22] Filed: Sep. 13, 1985
[30] Foreign Application Priority Data May 31, 1985 [CA] Canada ................................. 482991

[51] Int. Cl.⁴ ........................... E01D 1/00; E01D 9/00
[52] U.S. Cl. ..................................... 14/69.5; 14/71.1
[58] Field of Search ............................ 14/1, 71.1, 69.5; 404/35, 36; 414/537; 193/6, 35 TE; 296/61; 182/195

[56] References Cited

U.S. PATENT DOCUMENTS

| 606,520 | 6/1898 | Darrah | 193/6 |
| 3,642,156 | 2/1972 | Stenson | 414/537 |
| 4,429,766 | 2/1984 | Alimbau Marques | 182/195 |
| 4,460,291 | 7/1984 | Lamendour | 404/35 X |
| 4,571,144 | 2/1986 | Guidry et al. | 414/537 |

Primary Examiner—Stephen J. Novosad
Assistant Examiner—Matthew Smith
Attorney, Agent, or Firm—Michael M. Sakovich

[57] ABSTRACT

A compact ramp construction includes a series of nestable, telescopically extendable modules which are connected via an intermediate module to a base that detachably anchors one end of the ramp to a loading surface and which storably supports the ramp when the modules are nested. In one embodiment, the intermediate module is slidably connected to a pair of inclined slots on the base which raises the intermediate module to clear an edge of the loading surface as the nested modules are telescopically extended and lowered to another surface. Each one of the nestable modules has a pair of parallel side members that are spaced apart by an attached overlapping cross member. A single lug attached to the free end of each side member slidably engages an uppermost surface of a corresponding side member in an adjacent module and cooperates with the cross member of that module to support a load. In another embodiment, the intermediate module is hingedly connected to the base such that when the modules are nested, the ramp is stored by being pivoted about its hinges to lie folded against the base. Instead of a lug at the free end of each side member, the free ends of a second cross member in each module partly overlie corresponding side members of an adjacent module and cooperate with the first cross member thereof to support the load. All of the cross members provide a series of steps in a plane between loading and unloading surfaces.

22 Claims, 12 Drawing Figures

TELESCOPIC RAMP

FIELD OF THE INVENTION

The present invention relates generally to a loading ramp and more particularly to a ramp having nestable modules that may be telescopically extended.

BACKGROUND OF THE INVENTION

The currently extensive usage of small vehicles such as snowmobiles, all terrain vehicles, motorcycles, and rideable work vehicles such as lawn mowers, frequently necessitates the transportation of such vehicles to and from recreational and work locations. A problem commonly experienced relates to the safe loading and unloading of a vehicle as well as to transporting and storing of a suitable loading ramp since small trucks or trailers are frequently used and little storage space is available. As a result, makeshift loading and unloading arrangements using wood planks and the like for loading and unloading purposes may be used. Safety may then be deferred in favor of convenience which places the operator at risk together with his equipment.

A portable ramp suitable for loading and unloading small vehicles is disclosed in U.S. Pat. No. 3,984,891, issued Oct. 12, 1976 to Carl E. Weinmann. Although eminently suited to the task, the Weinmann ramp is not well adapted for convenient, compact storage. In this regard, the ramp is fabricated from a plurality of extruded members that require assembly and disassembly each time the ramp is used and then subsequently stored. Consequently, the Weinmann ramp is not well suited to domestic applications in which apparatus costs and convenience of use are principal considerations of ramp selection.

Recourse to the collapsible ladder art shows a type of construction that may be adapted to meet a portable ramp criterion of compactness. In this respect, U.S. Pat. No. 3,061,042, issued Oct. 30, 1962 to C. W. Giles together with U.S. Pat. No. 4,429,766, issued Feb. 7, 1984 to D. Salvador Alimbau Marques each show a ladder construction having a plurality of U-shaped modules that slidably nest together. Both Giles and Alimbau Marques disclose modules comprising a base and a pair of upright sections, with each module being smaller in width than the preceding module which facilitates the nesting arrangement when all of the modules are contracted. Although this nesting arrangement facilitates the ramp criteria of compactness and convenient storage, this arrangement results in an unstable ramp structure at the end where the U-shaped modules are narrow. Furthermore, a rigid sliding arrangement which is desirable in ladders and which is disclosed by Alimbau Marques is undesirable in a ramp construction which requires a pivotal quality to accommodate various differences in height between loading and unloading surfaces.

SUMMARY OF THE INVENTION

A principal objective of the present invention is to provide a portable ramp having slidable modules that nest together for compact storage.

Another provision of the invention is a telescopic ramp structure that may be readily extended and contracted as required.

Still another provision of the invention is a portable ramp having pivotal connections which permit the ramp to accommodate various differences in heights between loading and unloading surfaces.

Another provision of the invention is a simplified ramp structure that is economical to fabricate.

The problems associated with the prior art may be substantially overcome and the foregoing objectives reached by recourse to my invention which is a telescopic ramp that comprises a plurality of pi-shaped modules each having a pair of parallel side members including side walls spaced apart in slidably nestable relation with corresponding side walls of an adjacent module. A first cross member of each module is of uniform length and transversly overlaps each pair of the side members and is attached thereto in overlying relation adjacent one end of the module. A single lug attached to the free end of each side member slidably engages in overlying relation an uppermost surface of a corresponding side member in an adjacent module, whereby the lug end of each module is held slidably captive between the cross member and lugs of the adjacent module.

DESCRIPTION OF THE DRAWINGS

The invention will now be more particularly described with reference to embodiments thereof shown, by way of example, in the accompanying drawings in which.

DESCRIPTION OF THE ILLUSTRATED EMBODIMENTS

Figure 1:
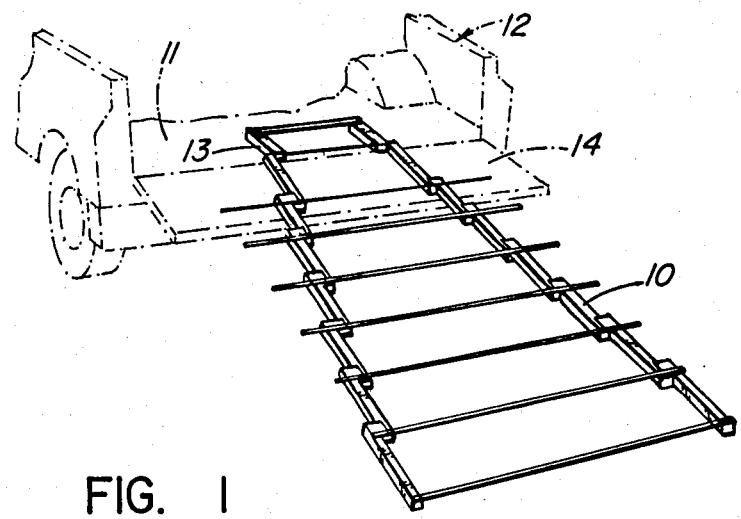
FIG. 1 is a perspective view of one embodiment of a telescopic ramp according to the invention showing the placement of one end of the ramp on the loading floor of a pickup truck.
Figure 6:
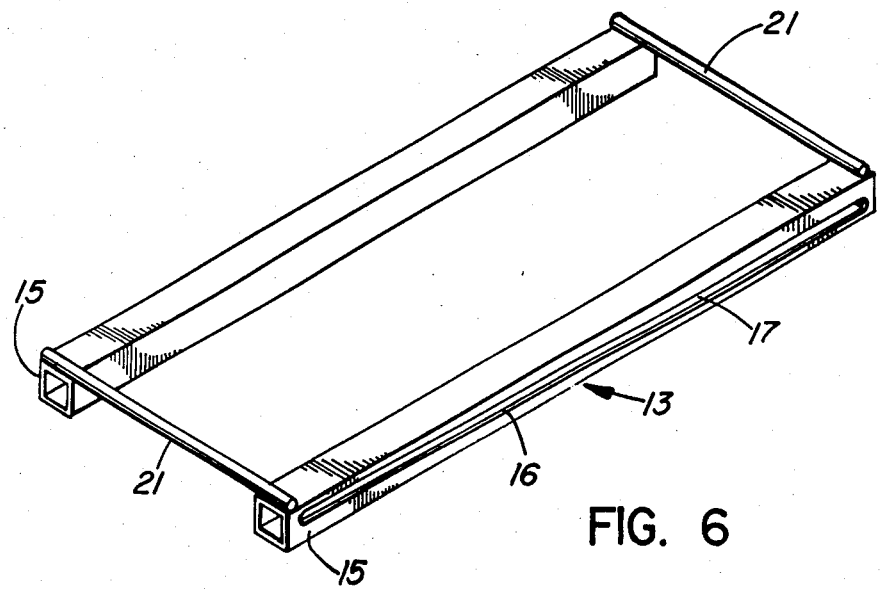
Fig. 6 is a perspective view of a base module of the ramp of FIG. 1.
Figure 7:
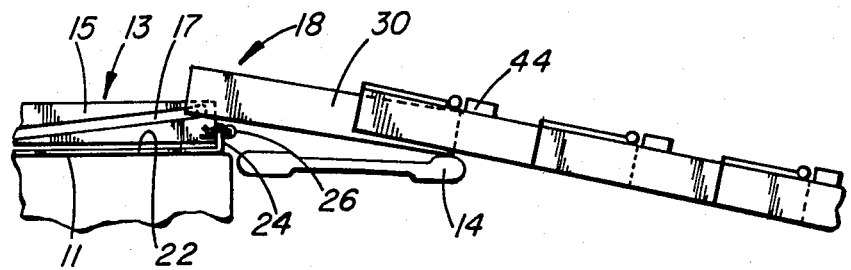
FIG. 7 is a fragmentary side elevation view of the ramp of FIG. 1 showing the manner of clearing an endgate of the truck.

FIG. 1 illustrates a perspective view of one embodiment of a telescopic ramp 10 and the placement of one end of the ramp for mounting on a loading floor 11 of a pickup truck 12. Both the floor 11 and the truck 12 are seen in a fragmentary, broken line form to show the location of a base module 13, a perspective view of which is shown in FIG. 6, relative to an endgate 14 of the truck. In this regard FIG. 7 illustrates a portion of a side member 15, a pair of which form the module 13 as shown in FIG. 6. Each member 15 is understood to comprise 1 ½ inch square steel tubing having an outwardly facing side wall 16 with an inclined longitudinal slot 17.

Figure 2:
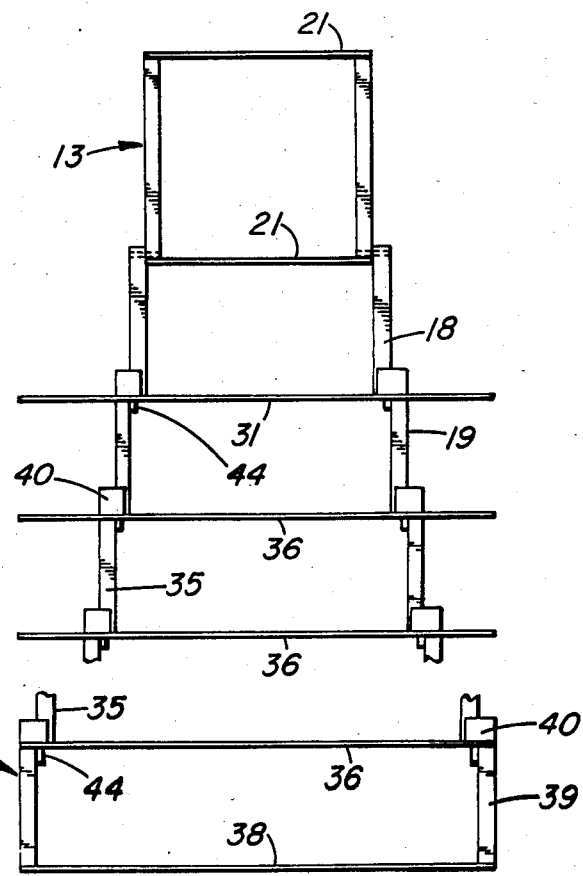
FIG. 2 is a fragmentary plan view of the ramp of FIG. 1.

A plan view of the ramp 10 is illustrated in FIG. 2 and will be seen to comprise the module 13 followed by a single pi-shaped intermediate module 18, a plurality of pi-shaped ramp modules 19 and a single U-shaped end module 20. A characterizing feature of the ramp 10, best seen in its extended form as shown, is that the modules become increasing wider in a stepped manner when progressing from the module 13 to the module 20.

The side members 15 of the module 13 are spaced apart in fixed parallel relation by means of a pair of cross members 21. The members 21 each consist of ½ inch spring steel rod which overlies the pair of members 15 at each end and which is fastened to the uppermost surfaces thereof as by welding.

Figure 8:
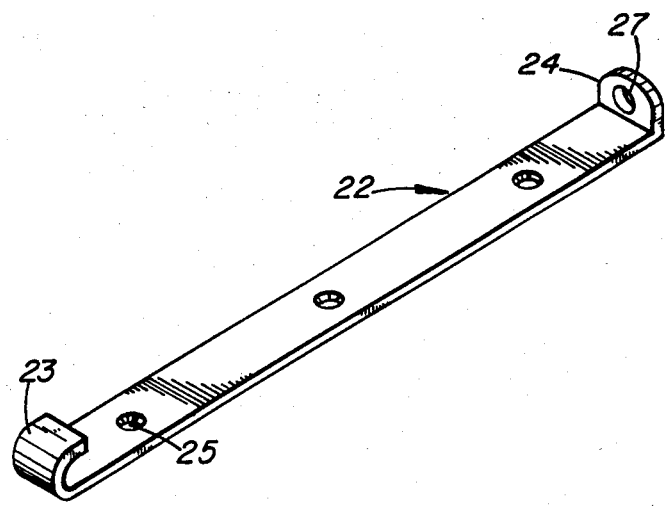
FIG. 8 is a perspective view of a base anchor shown in FIG. 7.

Referring next to FIG. 8, there will be observed a base anchor which comprises a strap 22 having a hooked end 23 and a flanged end 24. Three mounting holes 25 are provided to accept fasteners such as bolts, not shown, to securely mount a pair of straps 22 on the floor 11 in registry with the members 15 of the module 13. Having regard to FIGS. 6 and 7, it will be understood that each member 15 rests upon a corresponding strap 22 with the end 23 hooked into the open end of the member 15 furthest from the endgate 14. The other end of the member 15 abuts the end 24 as illustrated in FIG. 7 and is held in position on the strap 22 by means of a locking pin 26. The pin leads through an aperture 27 in the end 24 and into the foremost end of the member 15 to releasably lock the member 15 to the strap 22.

Figure 5:
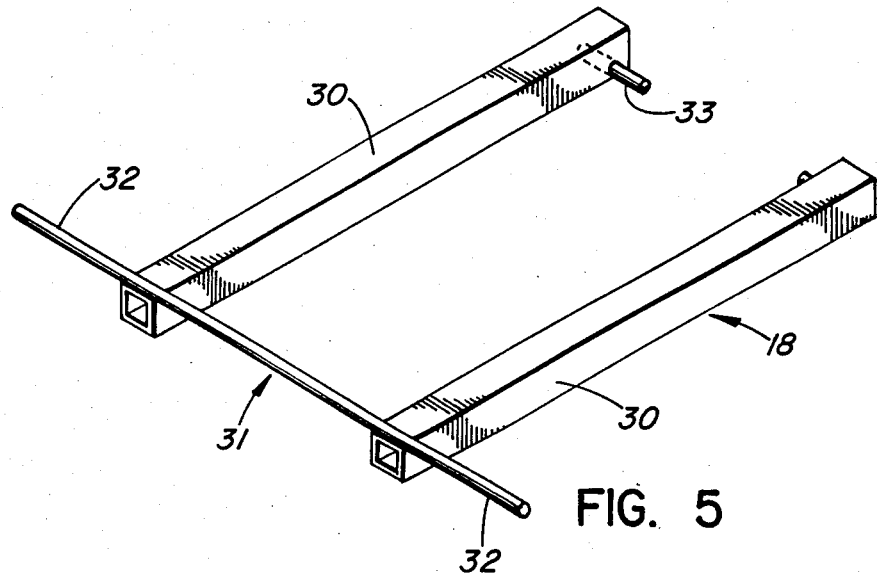
FIG. 5 is a perspective view of an intermediate module appearing in the ramp of FIG. 1.

A perspective view of the module 18 is shown in FIG. 5. The module comprises a pair of side members 30 having side walls that are spaced in slidably nestable relation with corresponding side walls of the members 15 in the module 13. The members 30 are held in fixed, parallel relation by a like cross member 31 with end portions 32 that transversly overlap the members 30 and which are attached thereto, as by welding, in overlying relation adjacent one end of the module 18. Retainer means at the opposite end of the module comprise a pair of ⅜ inch diameter steel pins 33 that fit into corresponding apertures of the facing side walls of the members 30 as shown. Each pin contacts the outer side wall of its member 30 and is welded to both side walls for additional strength. The position of each pin 33 will be observed in both of FIGS. 5 and 7 as being adjacent the lowermost corner of the free end of its member 30. Each pin 33 extends inwardly to slidably engage its corresponding slot 17. With regard to FIG. 7, it will be understood that the described position of the pins 33 provides a maximum clearance lift for the module 18 as the pins 33 slide upwardly along the diagonally positioned slots 17. The clearance provided by this feature raises the anchored end of the ramp 10 when it is extended to avoid interfering with the engate 14. When the ramp 10 is contracted, the pins 33 slide downwardly along the inclined slots 17 to permit nesting of the modules 13 and 18, as well as the plurality of modules 19 and the single end module 20, all of which are supported by the module 13 clear of the floor 11.

Each one of the modules 19 includes a pair of side members 35 which are also fabricated from 1 ½ inch square steel tubing. Similar to the module 18, the members 35 are held in spaced parallel relation by a like cross member 36 having end portions 37 that transversly overlap the members 35 and which are attached thereto, as by welding, in overlying relation to an uppermost surface thereof adjacent one end of the module.

Turning briefly to FIG. 2, it will be noted that the members 31 and 36 are of the same length to provide a uniform ramp width. However, the overlapping portions of these members vary in length inversely to the width of the modules. Observe that in the module 20, which is the widest module, there is no overlap for a cross member 38. With this exception, the module 20 is otherwise the same as the modules 19. Accordingly, the member 38 overlies a pair of parallel side members 39 and is attached to the uppermost surface thereof, as by welding, adjacent one end of the module.

In each one of the modules 18, 19 and 20 the free end of each side member has attached thereto, as by welding, a single lug 40 for slidably engaging in overlying relation an uppermost surface of a corresponding side member in an adjacent module. As a result, the lug end of each one of the modules 19 and 20 is held slidably captive between the cross member and lugs of the adjacent module and also functions as a fulcrum.

Figure 4:
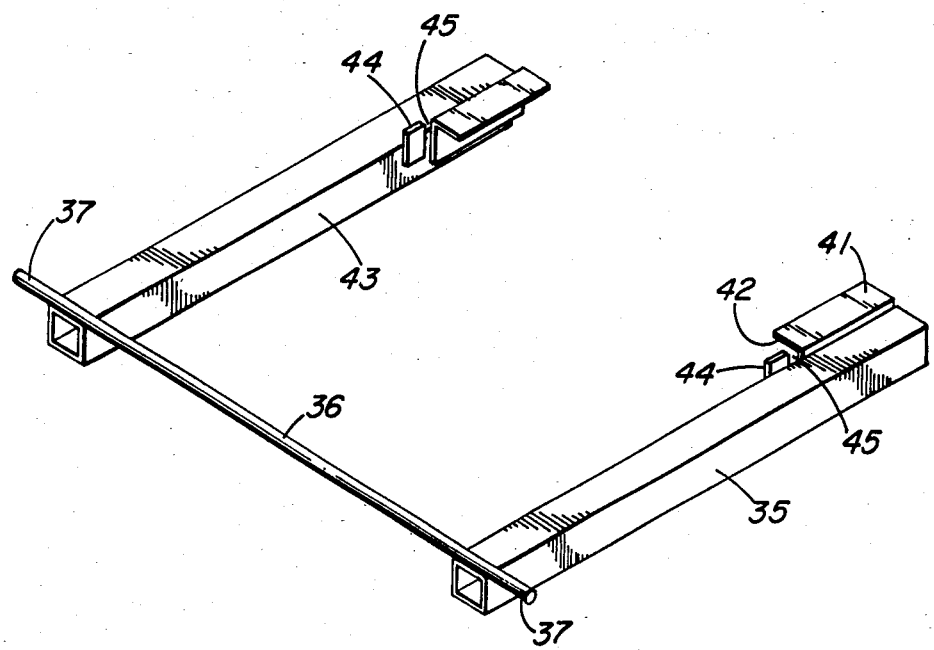
FIG. 4 is a perpective view of another embodiment of one module in the ramp of FIG. 1.

Another embodiment of a ramp module is illustrated in FIG. 4 and differs from the previously described module 19 only in the form of the single lug 40. Thus, whereas the lug 40 comprises a generally square steel plate welded in overlying relation to the uppermost surface at the free end of each side member with an overlapping portion extending inwardly to slidably engage the corresponding coplanar uppermost surface of the adjacent module, a lug 41 in the embodiment of FIG. 4 is a steel angle. Functionally, the lugs 40 and 41 are the same. However, the lug 41 has one side of the angle affixed to an inner facing side wall 43 of the member 35 as shown. Moreover, in order that the uppermost surfaces of all modules shall lie in a single plane, the second side of the lug 41 is raised so that its undersurface 42 is coplanar with the uppermost surface of the side member 35 as illustrated in FIG. 4.

Figure 3:
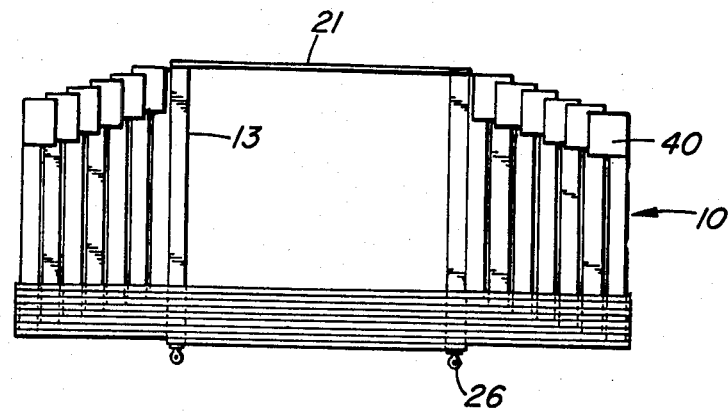
FIG. 3 is a plan view of the ramp of FIG. 1 shown in a contracted state.

Whichever lug embodiment is employed, the sliding configuration of a single lug at one end of each side member allows a downwardly pivotal movement of each module which facilitates contracting all of the modules to a smaller overall size. Thus, by permitting each module to pivot downwardly out of the plane of its preceding adjacent module, the modules may be contracted to form a compact package as illustrated in the plan view of FIG. 3 with all of the cross members being arranged in contacting relation as shown. Furthermore, ample support for a load is readily provided in this arrangement by providing a lug 40 or 41 having sufficient modulus in shear. Relational stability between adjacent modules is obtained through the frictional resistance that develops between the contacting surfaces of each lug and its corresponding side member together with the frictional resistance between the contacting surfaces of the overlapping cross members and their corresponding side members. Mainly, however, a locking tab 44 fastened to the side wall 43, as by welding, is in spaced relation with the lug 40 or 41, depending on the embodiment used, and provides a gap 45 into which a cross member 31 or 36 may lockingly fit.

Another embodiment of the present invention is illustrated in FIGS. 9-12. A top plan view of this embodiment appears in FIG. 9 as a telescopic ramp 47 which includes a pair of mounting straps 48 that are attachable to one side of the end gate 14. Each strap 48 includes a pair of apertures 49, aligned with corresponding apertures in a side wall of the end gate 14, through which fasteners, such as bolts 50, are fitted to threadably engage nuts 51 interiorly of the end gate.

Figure 9:
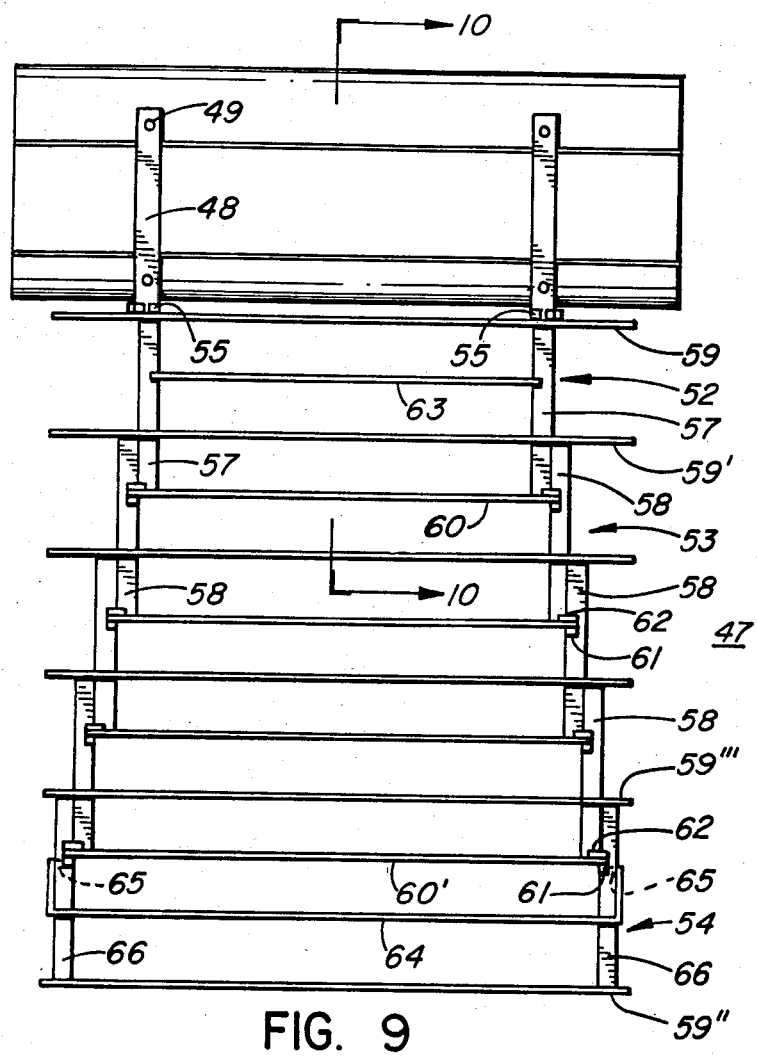
FIG. 9 is a top plan view of another embodiment of a telescopic ramp according to the invention showing one end of the ramp mounted on an end gate of a pickup truck.
Figure 10:
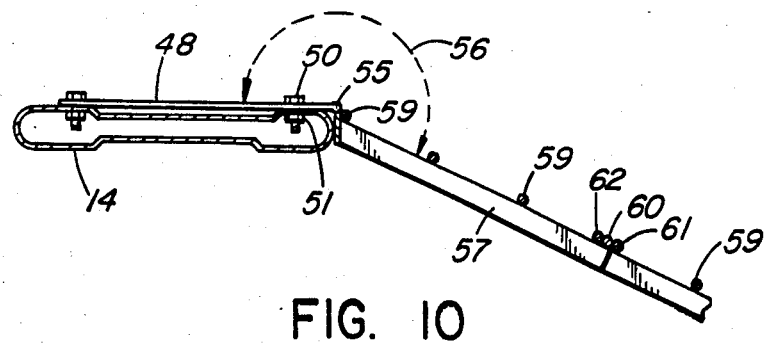
FIG. 10 is a fragmentary side elevation view of the mounted end of the ramp of FIG. 9 shown in section along lines 10—10.
Figure 12:
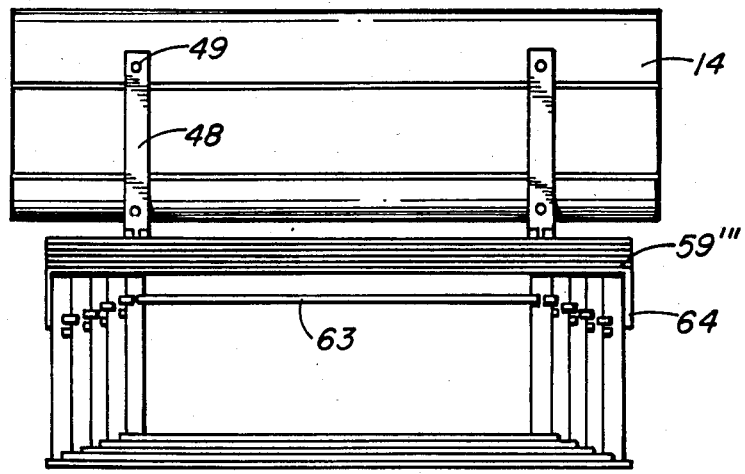
FIG. 12 is a top plan view of the ramp of FIG. 9 when contracted.

The ramp 47 comprises a plurality of nestable modules including a single pi-shaped upper end module 52, a plurality of pi-shaped ramp modules 53 and a single lower end module 54. As shown in FIG. 9, the modules may be telescopically extended to form a ramp between the end gate 14 and another surface. Conversely, the modules may be slidably contracted in nesting relation as indicated in FIG. 12. In the latter position, the ramp 47 is stored by being pivoted upwardly via a pair of hinges 55, following an arc 56, to overlie the straps 48 adjacent the end gate 14.

The module 52 comprises a pair of parallel side members 57 having side walls that are spaced in slidably nestable relation with mutually contacting side walls of a pair of parallel side members 58 in the module 53. This same arrangement applies between all succeeding adjacent pairs of modules as may be seen in FIG. 9.

It will be observed that the hinged ends of the members 57 are bevelled to clear the end gate 14 when the ramp 47 is extended and its free end is lowered to another surface.

The side members of the respective modules are all spaced apart in fixed parallel relation by means of cross members 59, all of which have the same length. The members 59 each consist of a ½ inch spring steel rod which overlies its corresponding pair of side members in overlapping relation at one end thereof where it is secured as by welding. The other end of each module is bridged by a shorter cross member as typified by a cross member 60 in the module 52. The member 60 likewise overlies and overlaps its corresponding pair of side members where it is also secured as by welding. It will be noted that whereas the members 59 are all of the same length to form a ramp of uniform width, the cross members as typified by the member 60 are progressively longer since the modules become increasingly wider in a stepwise manner from the module 52 to the module 54.

Having regard to FIG. 9, it will be observed that the overlapping portion of each member 59 progressively decreases from the module 52 to the module 54. The cross members that are typified by the member 60, however, have a constant overlap so as to engage the uppermost surfaces of adjacent modules. Thus, end portions of the members 60 overlap and engage the uppermost surfaces of the members 58.

The purpose of the overlap in the members 59 and in the cross members typified by the member 60 is to provide the ramp with an adequate load carrying capability. Relational stability between adjacent modules is provided by pairs of chocks, shown as short rods 61 and 62, which are welded in spaced relation on the uppermost surface of each member 58. The overlapping end portions of each member 60 fit between the rods 62 and 61 and lock its respective module in place when the ramp 47 is extended.

As regards the chocks, it will be observed that the rod 62 is longer than the rod 61 and overlaps the side members of its adjacent module to increase the load carrying capability of the ramp.

When the ramp 47 is extended, a wide space between the members 59 and 59' is narrowed to facilitate rolling thereover by a vehicle having small wheels. This is effected by adding a cross member 63 which is welded to the members 57.

Figure 11:
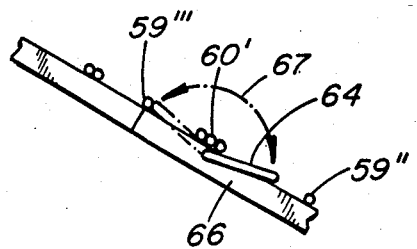
FIG. 11 is a fragmentary side elevation view of the free end of the ramp of FIG. 9.

A similar problem in the module 54 is resolved by the addition of a cross member in the form of a bail type handle 64 having ends 65 which are pivotably mounted in corresponding apertures located in the side walls of side members 66. As best seen in FIG. 11, the handle 64 follows an arc 67 to a position midway between the members 60' and 59" to reduce the wide space therebetween. In addition, the handle 64 may be used to lift the ramp and to keep a user's hands clear of the sliding modules as they are contracted. When the ramp 47 is stored, the handle 64 is pivoted to rest alongside the member 59''' as shown in FIG. 12.

Similar to the embodiment of FIGS. 1-8, adjacent modules 53 and 54 may be extended or contracted by permitting each module to pivot about its rods 62. Thus, each module pivots downwardly out of the plane of its preceding adjacent module to engage or disengage the overlapping end portions of the members 60 relative their respective locking chocks.

It will be apparent to those skilled in the art to whom this specification is addressed, that the embodiments heretofore described may be varied to meet particular specialized requirements without departing from the true spirit and scope of the invention disclosed. For example, whereas it is disclosed that the modules become progressively wider, the modules may as readily be made progressively narrower. And, having regard to the various embodiments diclosed, it will be understood that the load bearing relationships between modules need not depend on a lug 40 in the form of a steel plate or a lug 41 in the form of an angle. Such lugs may be substituted by a second cross member 60 in the form of a rod. Furthermore, the lugs or second cross members need not be positioned exactly as described since each may be mounted, for example, along either the top or bottom surfaces of each side member 35, 52 or 58 with corresponding changes in location of cross members 31, 36 and 59. In either arrangement, the principle of operation remains the same. Moreover, a flexible mat may be used in overlying relation with the ramp for bridging the spaces between the cross members to provide a more uniform support for a vehicle. Even the spacing and location of the rods 61 and 62 may be altered so that they function as respective stops for the members 59 and 60. The foregoing embodiments are therefore not to be taken as indicative of the limits of the invention but rather as exemplary structures of the invention which is described by the claims appended hereto.

The embodiments of the invention in which an exclusive property or privilege is claimed are defined as follows:

1. A telescopic ramp comprising:
   a plurality of pi-shaped modules each having a pair of parallel side members including side walls spaced apart in slidably nestable relation with corresponding side walls of an adjacent module;
   a first cross member of uniform length transversely overlapping each pair of side members of a module and attached thereto in overlying relation to adjacent one end of the module; and
   lug means attached to the free end of each side member for slidably engaging in overlying relation an uppermost surface of a corresponding side member in an adjacent module, whereby the lug end of each module is held slidably captive between the cross member and lug means of the adjacent module.

2. A ramp as claimed in claim 1, further comprising:

a base module having a pair of side members with longitudinally slotted side walls spaced apart in fixed parallel relation, the base side members being operably connected to a first module of the plurality of pi-shaped modules and adapted to supportably carry the modules.

3. A ramp as claimed in claim 2, further comprising:
an intermediate module having a pair of side members including side walls spaced in slidably nestable relation with corresponding side walls of the base;
second cross member corresponding to the first cross member with end portions transversely overlapping the intermediate module side members and attached thereto in overlying relation adjacent one end of the module; and
retainer means fixedly attached to the free ends of the intermediate module side members for slidably engaging the slotted side walls in captive relation.

4. A ramp as claimed in claim 3 wherein the longitudinal slots are inclined upwardly toward the end of the base module adjacent the intermediate module.

5. A ramp as claimed in claim 4, further comprising:
an end module having a pair of side members including side walls spaced apart in slidably nestable relation with corresponding side walls of the last pi-shaped module;
a third cross member corresponding to the first cross member with end portions overlying the end module side members and attached thereto adjacent one end of the module; and
a single lug attached to the free end of each end module side member for slidably engaging in overlying relation an uppermost surface of a corresponding side member in the last module of the plurality of pi-shaped modules, whereby the lug end of the end module is held slidably captive between the first cross member of the last module and its lug means.

6. A ramp as claimed in claim 5 wherein the base module further comprises a pair of fourth cross members, each being connected to the base module side members between the opposite ends thereof to maintain said fixed, parallel relation.

7. A ramp as claimed in claim 6, further comprising:
means for detachably anchoring the base module to a flat mounting surface.

8. A ramp as claimed in claim 7 wherein all side members are fabricated from rectilinear, hollow steel tubing.

9. A ramp as claimed in claim 7 wherein the base anchoring means comprises a pair of straps adapted to supportably carry the base module side members, each strap having a body portion, a hooked end adapted to fit into one open end of a base module side member and a flanged end abutting the other end, a first aperture through the flanged end, a locking pin leading through the aperture into the other open end of the base module side member for locking the one to the other and a plurality of second apertures through the body portion for fastening each strap to the mounting surface.

10. A ramp as claimed in claim 9 wherein the retainer means comprise an aperture formed in a facing side wall of each intermediate module side member at a lowermost corner of the free end thereof and a steel pin fixedly positioned in each aperture and extending outwardly therefrom to slidably engage a corresponding slot in the side members of the base module.

11. A ramp as claimed in claim 5 wherein the cross members are each of the same length and are fabricated from ½ inch spring steel rod.

12. A ramp as claimed in claim 11 wherein the lug means comprise a single lug.

13. A ramp as claimed in claim 12 wherein the lugs are fabricated from steel plate having a sufficient modulus in shear to support an expected ramp load.

14. A ramp as claimed in claim 12 wherein the lugs are fabricated from steel angle having a sufficient modulus in shear to support an expected ramp load.

15. A ramp as claimed in claim 12 further comprising:
a flexible mat overlying the modules for bridging the spaces between the cross members when the ramp is extended.

16. A ramp as claimed in claim 1, further comprising:
a pair of mounting straps spaced apart in fixed parallel relation;
means for securing the mounting straps to a flat mounting surface; and
hinge means connecting an end one of the modules with the mounting straps.

17. A ramp as claimed in claim 16, wherein the hinge means connect corresponding free ends of the side members of the end one of the modules and mounting straps to permit pivotal movement of the nested modules into overlying relation with the mounting straps for storing the ramp.

18. A ramp as claimed in claim 17, wherein the lug means comprise a second cross member in each module transversely overlying and attached to the pair of side members adjacent the other end of the module, each second cross member having free ends that partly overlap the side members of an adjacent module to engage the uppermost surfaces of side members in adjacent modules.

19. A ramp as claimed in claim 18, further comprising chock means fixedly mounted on the partly overlapped portion of each side member for interlocking all adjacent modules when the ramp is extended.

20. A ramp as claimed in claim 19, wherein the chock means comprise first and second short rods in each module fixed in spaced apart relation on the uppermost surface of each side member, one of the rods being longer than the other and overlapping each corresponding side member of an adjacent module to increase the load carrying capacity of the ramp, and to act as a pivot when extending or contracting the ramp.

21. A ramp as claimed in claim 20, wherein the hinged ends of the side members of the end one of the modules are bevelled to permit pivoting the ramp through the plane of the mounting surface to either side thereof.

22. A ramp as claimed in claim 21, further comprising in the other end one of the modules a bail handle having side portions with free ends that are pivotably mounted in respective ones of the side members and an interconnecting cross member portion spanning the side portions intermediate the first and second cross members of the other end one of the modules for manipulating the ramp.

* * * * *